July 16, 1935.　　　　E. C. HESS　　　　2,008,393

AUTOMATIC CONTROL FOR FLUID BRAKES

Filed April 5, 1933　　2 Sheets-Sheet 1

Inventor
E. C. Hess.
By
Attorneys

July 16, 1935. E. C. HESS 2,008,393
AUTOMATIC CONTROL FOR FLUID BRAKES
Filed April 5, 1933 2 Sheets-Sheet 2
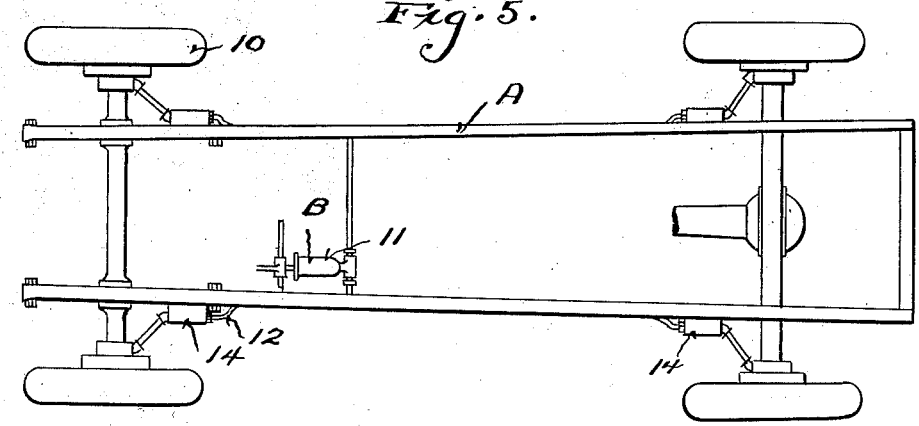
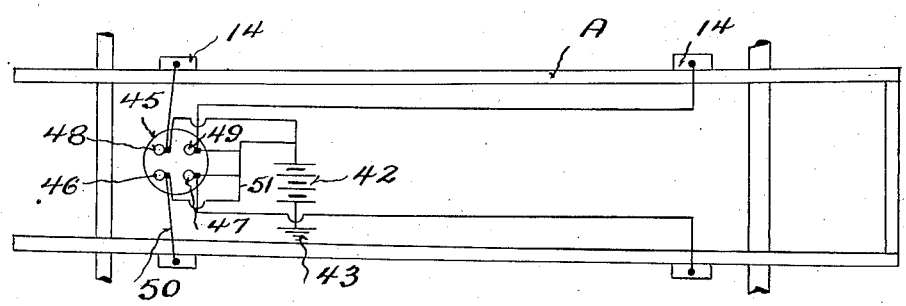
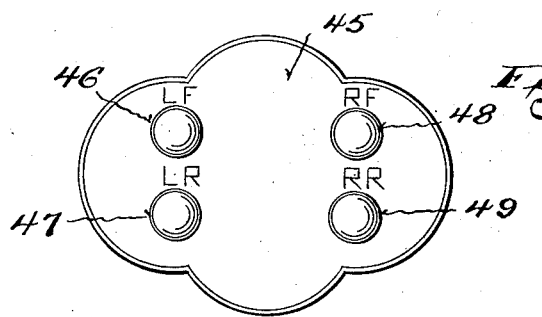

Patented July 16, 1935

2,008,393

UNITED STATES PATENT OFFICE 2,008,393

AUTOMATIC CONTROL FOR FLUID BRAKES

Edward C. Hess, Berlin, Wis., assignor of one-third to Emil Hess, and one-third to M. J. Paul, both of Berlin, Wis.

Application April 5, 1933, Serial No. 664,570

2 Claims. (Cl. 303—84)

This invention appertains to vehicle brakes of the hydraulic type and has for one of its primary objects the provision of novel means for giving a suitable signal to the driver of the vehicle, should a leak occur in any one of the brake cylinders, so that the driver of the vehicle can instantly take the necessary steps to remedy such condition.

Another salient object of my invention is the provision of means, whereby should a leak occur in any one of the brake cylinders, an electric circuit will be closed through a signal light on the instrument board of the vehicle in plain view of the driver, an independent signal light being provided for each brake, so that the driver will be immediately notified as to which brake is not in proper working condition.

A further important object of my invention is the provision of a novel attachment for hydraulic brakes embodying novel cylinder units interposed between each wheel brake and master cylinder, the cylinder units functioning to automatically cut off the supply of fluid to a leaking brake from the master cylinder, so that loss of fluid will only result in the leaky brake, thereby rendering the brakes on the other three wheels operative during the interval of repairing the leaky brake.

A further important object of my invention is the provision of novel means whereby any particular brake will be automatically cut off from the master cylinder to prevent loss of fluid should a leak occur therein and at the same time impart a signal to the driver of the vehicle to indicate such brake has been rendered inoperative.

A further object of my invention is the provision of novel means whereby the fluid can be readily by-passed around the floating piston of my novel valve unit to recharge the brake cylinder after the leak has been repaired.

A still further object of my invention is to provide a novel signal and valve attachment for hydraulic vehicle brakes of the above character, which will be durable and efficient in use, one that will be simple and easy to manufacture and incorporated with a hydraulic brake system at a small cost.

With these and other objects in view, the invention consists in the novel construction, arrangement and formation of parts, as will be hereinafter more specifically described, claimed and illustrated in the accompanying drawings, in which:—

Figure 5 is a diagrammatic view illustrating a vehicle chassis in top plan, showing my improved valve and indicator units incorporated with the hydraulic brakes thereof.

Figure 6 is a diagrammatic view illustrating the electrical circuits for the signal lights.

Figure 7 is a face view of the panel carrying the signal lights for the different brake units.

Figure 1:
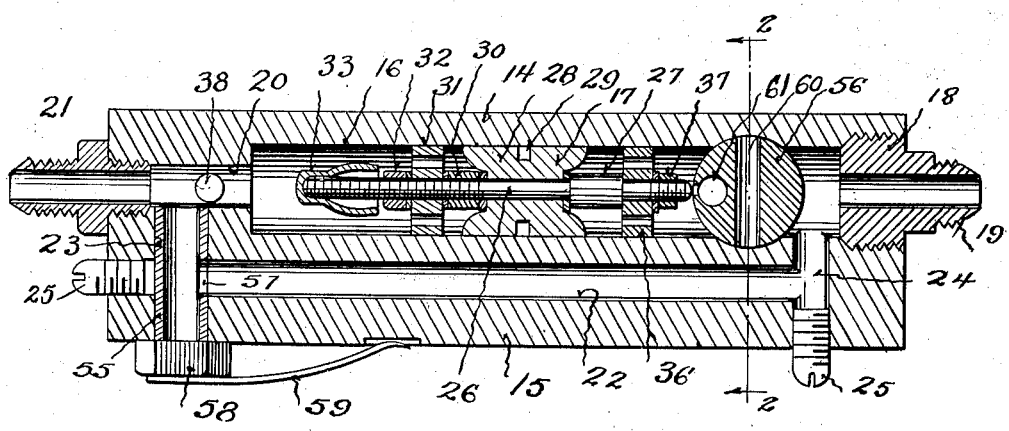
Figure 1 is an enlarged longitudinal section through one of my novel valve and signal units the shut-off valve being shown in its inoperative closed position.

Referring to the drawings in detail, wherein similar reference characters designate the corresponding parts throughout the several views, the letter A generally indicates the chassis of a motor vehicle provided with hydraulic brakes B for the wheels 10 of said vehicle.

The hydraulic brake system B is of substantially the ordinary type and has only been shown diagrammatically and includes the master cylinder 11 connected by means of fluid conductor pipes 12 with the brake cylinders (not shown) for the brake drums of the wheels 10. Fluid is forced from the master cylinder 11 to the brake cylinders through the medium of the usual foot pedal (not shown).

In accordance with my invention, I interpose in each fluid conductor pipe 12 between the master cylinder 11 and each brake cylinder one of my novel valve units 14. Each of these valve cylinders 14 embodies a housing 15, which can be in the nature of a solid metal block bored out from one end to provide an interior cylinder or cylinder chamber 16. This cylinder chamber 16 receives the novel floating piston or valve 17. After the floating piston and valve unit 17 has been placed into the cylinder chamber, the same is closed by a removable plug 18 carrying a threaded nipple 19 to which is detachably secured the fluid conductor pipe leading from the master cylinder.

By referring to Figure 1, it can be seen that the removable plug is provided with an axial bore, so that the fluid conductor pipe leading from the master cylinder will have communication with the piston chamber. The housing forwardly of the piston chamber 16 is provided with a reduced bore 20, which also communicates with the piston chamber and the bore has threaded therein a nipple 21 to which is connected the fluid conductor pipe leading to the particular brake cylinder for one of the vehicle wheels.

Formed within the housing 15 is a longitudinally extending by-pass passageway 22, which has communication with the opposite ends of the brake cylinder on opposite sides of the floating cylinder through the medium of transverse passageways 23 and 24 respectively. Removable closure plugs 25 are carried by the housing for facilitating the cleaning of the valve and piston unit and for facilitating the forming of the various passageways within the housing.

Referring more particularly to the floating piston and valve unit 17, it is to be noted that the same embodies a rod 26 having an annular enlargement 27 formed thereon adjacent to the rear end thereof. Slipped on the rod 26 from the forward end thereof against the enlargement 27 is the piston body 28, which is preferably formed from rubber or the like, and the same is provided with an annular groove 29 intermediate its ends for facilitating the expansion and contraction thereof. After the piston body 28 has been placed into position, a sleeve 30 is inserted on the rod against which is placed the ported washer 31. The piston body 28, the spacer sleeve 30 and the ported washer 31 are held in position on the rod by means of a suitable nut 32.

Figure 4:
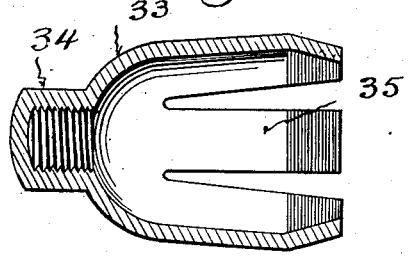
Figure 4 is a longitudinal section through the resilient contact head carried by the floating piston for engagement with said insulated contact plug.

The extreme forward end of the rod 26 has threaded thereon a resilient contact head 33, more clearly illustrated in Figure 4 of the drawings. The purpose of this contact head will be more fully described, but it is to be noted that the same embodies an interiorly threaded cap 34, which receives the threaded end of the rod and rearwardly extending resilient split skirt 35 forming resilient fingers.

Slipped upon the rear end of the rod 26 against the enlargement 27 is a ported washer 36 of the same construction as the washer 31, and the washer 36 is held on the rod by means of a nut 37.

In operation of my improved piston and valve unit, the valve 55 is closed and the valve 56 is opened, and when the brake pedal is depressed, the brake fluid will be forced into the rear end (right-hand side Figure 1) of the cylinder chamber 16 through the nipple 18. The fluid will flow through the passageway 60 of the valve 56 against the floating piston 17. This will force the floating piston 17 forwardly (to the left-hand side of Figure 1) forcing the fluid from out of the chamber through the nipple 21 into the brake cylinder (not shown) causing the application of the brake. Should a leak occur in the brake cylinder or between the brake cylinder and the valve unit, the loss of fluid from the front part (left-hand side of Figure 1) of the cylinder chamber and the pressure of the fluid acting on the rear of the piston will force the piston forwardly moving the resilient contact head 33 into the reduced bore 20 and when the piston has reached its extreme forward movement, the travel thereof will be stopped. Obviously, no loss of fluid can occur in rear of the piston and consequently, only a minimum amount of the fluid will be lost.

Figure 3:
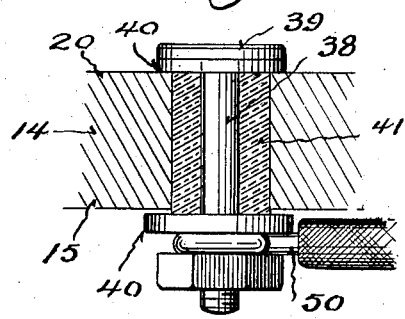
Figure 3 is a detail fragmentary sectional view taken on a still larger scale illustrating the novel construction of the insulated plug utilized in conjunction with the alarm circuit.

In connection with each cylinder and valve unit, I provide novel means for giving a signal to the driver of the vehicle, when a leak occurs in any brake cylinder or forwardly of the traveling piston 17. This means includes the resilient contact head 33 previously described and a contact plug or pin 38 carried by each of the piston units. As shown in Figure 3, the contact plug or pin is provided with a flat contact head 39 disposed in the reduced bore 20 and in the path of the resilient contact head 33. The contact plug 38 is thoroughly insulated from the housing and the vehicle chassis by the use of washers 40 formed from insulation and a sleeve 41 formed of insulation which surrounds the said contact plug or pin.

In Figure 6 I have illustrated the wiring diagram for the entire brake system and it can be seen that a source of electrical energy, such as a battery 42, is provided. This can be the ordinary storage battery of the vehicle. One terminal of the storage battery 42 is grounded to the vehicle chassis as at 43 and consequently, each of the housings 15 is grounded to the battery in that the housings are secured by means of metal bolts to the chassis frame. An attaching lip 44 is formed on each housing to facilitate this attachment.

Arranged on the instrument panel of the vehicle or at any other preferred convenient point is an indicator panel 45 carrying lamp sockets for indicating lamps 46, 47, 48 and 49. By referring to Figures 6 and 7, it can be seen that an independent signal lamp is provided for each vehicle brake and a suitable mark is placed on the panel above each lamp, so as to indicate to the driver which lamp is used with each brake. Electrically connected to each contact plug pin 38 is an electrical conductor wire 50 and this wire leads to one terminal of its lamp socket and the other terminal of each lamp socket has connected thereto a wire 51, which leads to the other terminal of the storage battery 42.

Obviously, when the resilient contact head 33 engages the contact plug 38, a circuit will be closed through the signal light provided for that particular brake cylinder. The lighting of this light will immediately disclose to the vehicle driver that the said brake is inoperative.

Thus, from the foregoing, it can be seen that I have not only provided means for preventing undue loss from the system, so as to prevent all of the brakes from becoming inoperative, but I have also provided means whereby an effective signal will be given to the operator to indicate which one of his brakes is becoming inoperative.

In connection with my improved cut-off valve and piston unit, I provide a simple and efficient means for permitting the recharging of the brake cylinder with fluid after repairs have been made thereto. This means includes the passageways 22, 23 and 24 and in connection with these passageways, I employ two cut-off valves 55 and 56. The cut-off valve 55 is located within the passageway 23 and consists of a hollow sleeve having a port 57 therein for communication or registration with the longitudinal passageway 22. A head 58 is formed on the valve or cut-off 55, so that the same can be readily turned to permit the port 57 to be moved into and out of registration with said passageway 22. An indicator and holding spring 59 is carried by the head 58 and suitable indicating marks can be employed on the housing to cooperate with the pointer 59 for indicating the "off" and "on" cut-off valve. Obviously, from the showing in Figure 1, it can be seen that when the valve is in its "on" position that communication will be established between the passageway 22 and the bore 20.

Figure 2:
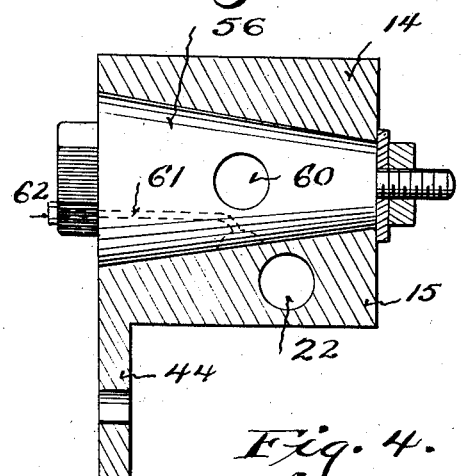
Figure 2 is a transverse section through said unit taken substantially on the line 2—2 of Figure 1, the shut-off valve being shown in its open normal position in this view.

The cut-off valve 56 is of the rotatable plug type and is more clearly illustrated in Figure 2 of the drawings. This plug valve 56 extends transversely through the housing 15 and is provided with a diametrically extending passageway 60. When the plug valve 56 is in one position, communication is established from the nipple 19 to the floating piston unit 17 and when the same is in its other position, communication is cut off between the nipple 19 and said floating piston.

Normally, both the cut-off valves 55 and 56 are so disposed that communication will be established between the master cylinder and the nipple 19 and the floating piston and communication will be cut off between the bore 20 and the passageway 22. In case of a leak in a particular brake cylinder and after the repair thereof, the cut-off valves 55 and 56 are turned to the position shown in Figure 1 of the drawings and consequently, fluid is permitted to by-pass around the floating piston into the brake cylinder to recharge the same. The recharging of the brake cylinder will tend to return the floating piston to its normal position with the contact head 33 from out of engagement with the contact plug 38 in that the pressure of the fluid will be against the forward end (left-hand side Figure 6) of the floating piston 17.

To permit the return of the floating piston to its normal position, it is necessary to allow the bleeding of the trapped fluid between the plug valve 56 and the floating piston. This is accomplished by providing a bleed passageway 61 in the plug valve. The bleed passageway 61 is adapted to communicate with the piston chamber when the plug valve is in its cut-off position as shown in Figure 1. This passageway opens out through the outer end of the plug valve, as shown in Figure 2 of the drawings, and the passageway can be normally closed by means of a small removable screw 62. After the brake cylinders have been recharged, the valves 55 and 56 are returned to their normal position and the devices function in their normal manner.

Changes in details may be made without departing from the spirit or the scope of this invention, but what I claim as new is:—

1. In an hydraulic controlled system, a fluid conductor, a housing disposed within the length of said fluid conductor having a chamber, a floating piston in said chamber capable of movement in both directions in said chamber under influence of the fluid, means for by-passing the fluid from one end of the chamber to the other around said piston including a passageway connected with the opposite ends of the chamber, a combined cut-off and bleed valve in said chamber at one side of the piston for controlling the flow of fluid into the chamber and the bleeding of fluid from said chamber between the piston and the valve to the exterior of the housing.

2. In an hydraulic controlled system, a fluid conductor, a housing disposed within the length of said fluid conductor having a chamber, a floating piston in said chamber capable of movement in both directions in said chamber under the influence of the fluid, said floating piston including a metallic piston rod, a flexible piston body secured to the rod intermediate the ends thereof and snugly engaging the walls of the chamber, and guide washers on the piston rod beyond the piston body engaging the walls of the chamber, a stationary contact carried by the housing and disposed at one end of the chamber, and a contact head carried by one end of the piston rod for engaging the stationary contact when the piston is forced to one end of the chamber, and means for by-passing the fluid from one end of the chamber to the other around the piston.

EDWARD C. HESS.